3,533,552
THERMOSTATICALLY ACTUATED
RADIATOR VALVE
James F. Scherer, 2 Waljo Trail, Milford, Ohio 45150
Filed May 16, 1969, Ser. No. 825,238
Int. Cl. F01p 7/16
U.S. Cl. 236—34                                       4 Claims

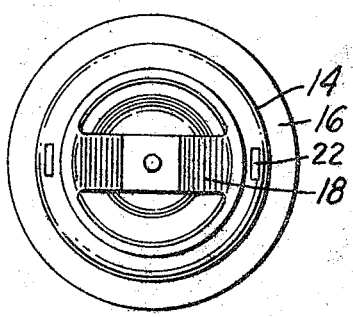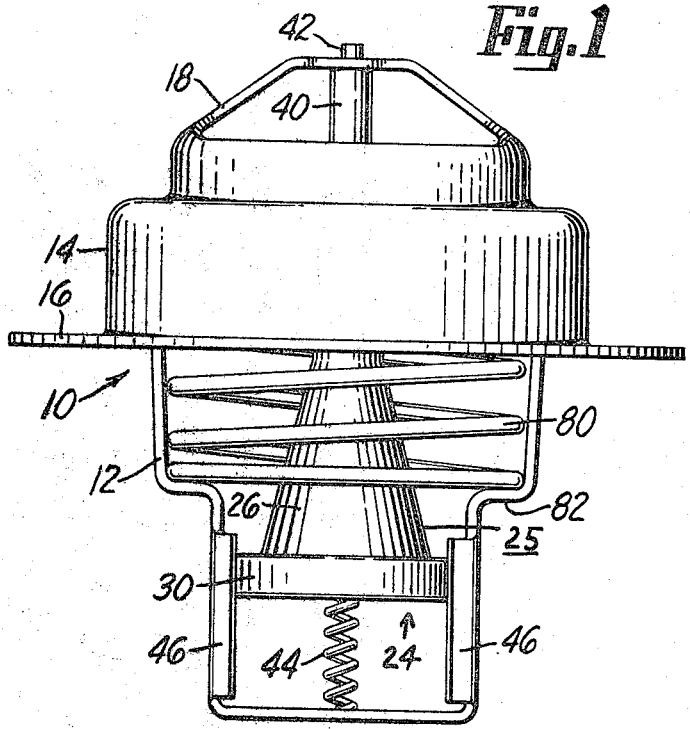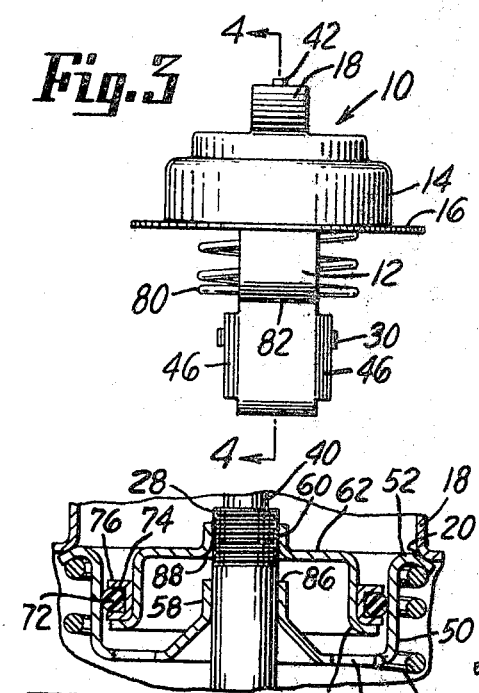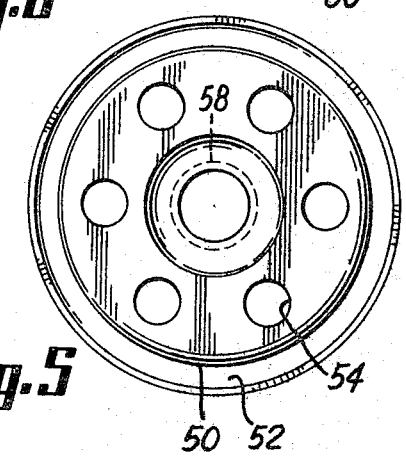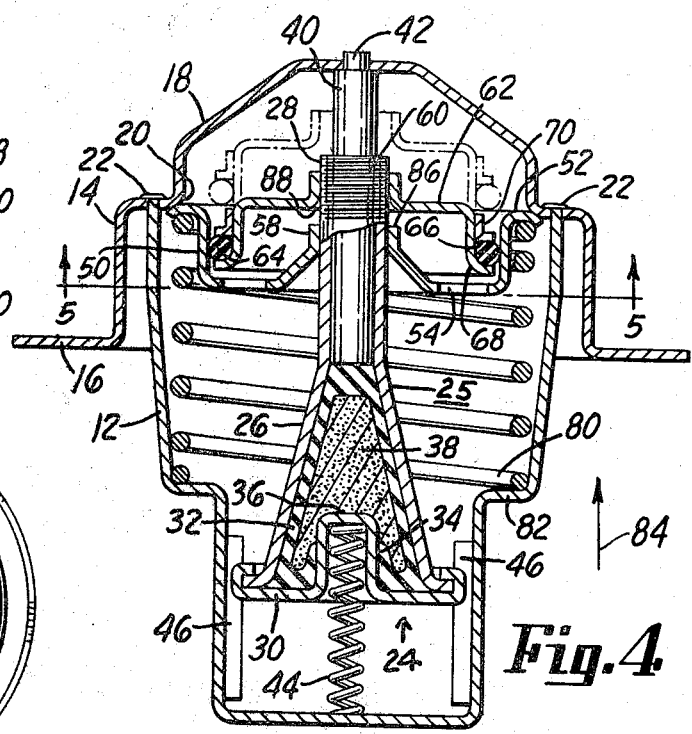
INVENTOR.
JAMES F. SCHERER
BY
Howard S. Keiser
ATTORNEY United States Patent Office 3,533,552
Patented Oct. 13, 1970

ABSTRACT OF THE DISCLOSURE

A fail-safe radiator valve operable by a thermo-actuator to control the flow of fluid through the valve. A ported closure member is supported for sliding movement on the housing of the thermo-actuator and is spring-urged toward closed position. A control element is secured to the plunger of the thermo-actuator and cooperates with the closure member to prevent the flow of fluid through the ports during normal operation of the valve. In the event of failure of the thermo-actuator, the plunger moves beyond its normal retracted position and thereby moves the control element to a position in which fluid is permitted to flow through the ports in the closure member.

RELATED APPLICATION

Reference is hereby made to United States patent application Ser. No. 825,239, entitled, Thermo-Actuator Device, filed on even date herewith.

BACKGROUND AND SUMMARY OF THE INVENTION

This invention relates to valves of the type commonly used to control the flow of coolant through the radiator of an automotive vehicle. More particularly, the invention is concerned with a fail-safe valve of the poppet type which will fail with the valve in an open position and thereby permit continued operation of the vehicle.

Currently available types of radiator valves are so constructed that in the event of failure of the thermo-responsive actuator, the return spring of the valve operates to restore the valve element to the closed position, thereby blocking the circulation of the cooling liquid through the radiator. As a result, overheating of the engine is likely to occur with continued operation of the vehicle. It is the purpose of the present invention to provide a radiator valve which is so constructed and arranged that in the event of failure of the temperature responsive actuator, the valve will open and permit the flow of cooling liquid through the radiator. This result is attained by utilizing a known phenomenon of thermo-responsive actuator devices, namely, in case of failure of the temperature sensitive element thereof, over-travel of the plunger in the return direction is permitted. This additional movement of the plunger is utilized to reopen the valve and permit the circulation of cooling fluid through the radiator. Hence, continued operation of the vehicle is possible after failure of the radiator valve without danger of overheating the engine.

Accordingly, it is an object of this invention to provide a fail-safe radiator valve which will operate in a normal manner to regulate the flow of cooling fluid through the automobile radiator but will automatically open in the event of failure of the thermo-responsive actuator thereof.

Another object of the invention is to provide a fail-safe radiator valve of the poppet type in which the characteristic feature of thermo-responsive actuator devices to permit over-travel of the valve operating plunger beyond the normal closed position of the valve upon failure of the actuator device is utilized to cause reopening of the valve and permit continued operation of the vehicle.

DESCRIPTION OF THE INVENTION

In the drawings:
FIG. 1 is a side elevation of a radiator valve incorporating the present invention.
FIG. 2 is a top view of the valve shown in FIG. 1.
FIG. 3 is an end elevation of the valve shown in FIG. 1.
FIG. 4 is a cross sectional view taken along the line 4—4 in FIG. 3.
FIG. 5 is a view taken along the line 5—5 in FIG. 4.
FIG. 6 is a fragmentary cross-sectional view showing a modified form of mounting for the O-ring seal.

A preferred embodiment of the new fail-safe poppet type radiator valve is shown in FIGS. 1 to 6 inclusive of the drawings. As therein illustrated, the valve includes a valve body 10 which serves as a frame for supporting the valve mechanism and also provides a valve opening through which the cooling liquid employed in the vehicle cooling system may flow when the valve is opened. The valve body in the embodiment shown herein is formed in two pieces, the bottom part 12 being in the form of a stirrup, and the upper part 14 including a valve mounting flange 16 and an upper stirrup 18. The piece 14 also includes an internal shoulder 20 which provides a seat for a closure member of the valve. As illustrated in FIG. 4, the lower stirrup 12 is securely fastened at 22 to the upper part 14 of the valve body so as to form a rigid unit therewith.

Supported in the valve body coaxially of the valve seat 20 is a thermo-actuator 24 which may be of the type shown in my co-pending patent application Ser. No. 825,-239 referred to above, or any other thermo-responsive actuator characterized by its ability to permit over-travel of the plunger in case of failure of the temperature responsive element thereof. In the thermo-actuator herein shown, the unit includes a housing 25 consisting of two pieces, i.e., a cone-shaped casing 26 which merges at its upper end into a cylindrical portion 28, and a bottom piece or base 30 which closes the lower end of the casing 26. Within the housing is a resilient capsule 32 provided at its base with a reentrant portion 34 which forms a liquid-tight seal with an integrally formed protrusion 36 extending inwardly from the base 30. The capsule 32 is completely filled with a thermo-sensitive material of known type which is characterized by a rapid increase in volume as the material changes from a solid to a liquid state. When this occurs, the capsule expands and causes an actuating plunger 40 to move upwardly as viewed in FIG. 4. The upper end of the plunger is attached to the upper stirrup 18 by a tenon 42 on the plunger extending through an aperture provided therefore in the stirrup. Thus, the plunger is maintained stationary with respect to the valve body. Therefore, when the plunger is projected from the housing 25 by expansion of the capsule, the housing is caused to move downwardly against the urgency of a compression spring 44, seated at its upper end in the integrally formed protrusion 36 provided on the base 30. The housing is guided for sliding movement in the valve body by means of two sets of ears 46 struck up from the lower stirrup 12.

Cooperating with the valve seat 20 is a seat engaging member 50 formed at its top as viewed in FIG. 4 with a rolled flange 52 adapted to engage and cooperate with the seat 20 when the valve is closed. The member 50 is also provided with a series of ports 54 the purpose of which will hereinafter be explained. A hub 58 on the member is bored to provide a sliding fit with the cylindrical portion 28 of the casing 26.

Surmounting the member 50 and secured to the casing 24 by a screw thread 60 or other suitable fastening means is a control element 62. This element is imperforate and is provided at its outer periphery with an O- ring seal for engaging with the sidewalls of the member 50. The O-ring 64 is mounted for limited rolling movement in a groove 66 formed between a rolled over flange 68 on the element 62 and a flanged ring 70 press fitted on the cylindrical sidewall of the element 62. The O-ring cooperates in a well known manner with the sidewalls of the member 50 to provide a tight seal therewith and prevent the flow of fluid through the ports 54. Thereby, the member 50 and element 62 together provide a valve closure for the seat 20 formed in the valve body.

A modified form of mounting for the O-ring is shown in FIG. 6. In this arrangement, an O-ring 72 is received in a groove 74 provided in a ring 76 press fitted on the cylindrical sidewall of the element 62. The groove 74 is preferably of sufficient width to permit limited rolling movement of the O-ring when element 62 is moved relative to member 50.

The valve seat engaging member 50 which is slidably mounted on the cylindrical portion of the housing 25 is normally urged into engagement with the valve seat 20 by a compression spring 80 which is biased between the underside of the flange 52 and a shoulder 82 formed on the lower stirrup 12. Spring 80 also serves to return the plunger 40 to its retracted position within the housing when the capsule contracts upon a decrease in the temperature of the cooling liquid.

When the temperature of the cooling liquid is below the normal operating range of the capsule and the plunger 40 is in its retracted position, the parts assume the positions shown in FIG. 4. Thus, the valve is closed and flow of cooling liquid from the engine block to the radiator in the direction of arrow 84 is prevented. As the liquid is heated by operation of the engine, a temperature is finally reached where the material 38 is the capsule liquefies and expands the capsule, thereby moving the housing 25 downward. The first portion of the movement of the housing and control element 62 is idle with the O-ring 64 rolling on the inner-sidewalls of the member 50. Thereafter, the upper surface 86 of the hub 58 on the member 50 is contacted by the bottom face 88 of the element 62 thereby carrying the member 50 along with it in the downward direction. This causes the flange 52 to move away from the seat 20 against the bias of the spring 80 and open the valve to the flow of cooling liquid. As the temperature of the cooling liquid drops, the thermo-actuator capsule contracts and the housing 25 moves upward under the joint influence of spring 44 and the pressure exerted by the liquid flowing in the direction of the arrow 84. Consequently, the valve moves toward its closed position to restrict the flow of cooling liquid in accordance with the temperature thereof.

In the event of failure of the thermo-actuator device which, in the type of device herein illustrated will occur if the material 38 for any reason is permitted to escape from the capsule 32, then the housing 25 will be permitted to move upwardly to the position shown in dot-dash outline in FIG. 4 under the influence of spring 44 as well as the pressure of the cooling liquid against the base 30 and the underside of the control element 62. In this position the control element no longer seals against the cylindrical sidewalls of the member 50 and cooling fluid is permitted to pass through the ports 54 and between the periphery of the O-ring and the flange 52 on member 50. Thereby, the valve will, in effect, be open to the flow of fluid therethrough so that the cooling liquid may pass through the radiator and thereby be cooled to a safe operating temperature. Thus, the valve will fail-safe and permit the flow of cooling liquid through the radiator until such time as the valve is replaced with a new one.

While the form of apparatus herein described constitutes a preferred embodiment of the invention, it is to be understood that the invention is not limited to this particular form of apparatus, and that changes may be made therein without departing from the scope of the invention which is defined in the appended claims.

What is claimed is:

1. In a fail-safe temperature responsive valve having a body provided with a valve seat therein and upper and lower stirrups attached thereto, a temperature responsive actuator including a housing supported on said lower stirrup for sliding movement relative thereto and a plunger attached to said upper stirrup, said plunger normally enjoying a limited range of movement outwardly and inwardly of said housing in responsive to changes in temperature of the surrounding fluid and movable inwardly beyond said range in the event of failure of said actuator, the combination of a valve member having ports formed therein and supported on said actuator housing for sliding movement between a closed position in which it is engaged with said seat and an open position in which it is disengaged therefrom, means for basng said member to its closed position, a control element secured to said housing and maintained in engagement with said member throughout the normal range of movement of said plunger, abutment means on said element adapted to engage with said member to move it to its open position against the urgency of said biasing means, and means to move said element out of engagement with said member when said plunger moves inwardly beyond its normal range of movement so as to open the ports and permit fluid flow in the event of failure of said actuator.

2. The valve of claim 1 wherein said control element is comprised of an imperforate disc with sealing means disposed between said disc and said valve member to effect closure of the ports by engagement of said disk with said valve member.

3. The valve of claim 2 wherein said sealing means includes an O-ring adapted to engage with a cylindrical surface on said valve member to form a fluidtight seal between said disc and said member.

4. The valve of claim 1 wherein said abutment means is spaced from said member when said plunger is at the inner limit of its normal range of movement to effect rolling of the O-ring on each cycle of operation of the valve.

References Cited

UNITED STATES PATENTS 2,690,874 10/1954 Stubblefield _____ 236—34
3,300,134 1/1967 Wahler _____ 236—34

EDWARD J. MICHAEL, Primary Examiner